June 27, 1967 J. MAURICE 3,327,820
CLUTCH FRICTION SYSTEM
Filed July 23, 1965 7 Sheets-Sheet 1

INVENTOR
JEAN MAURICE
By Young & Thompson
Attys.

June 27, 1967 J. MAURICE 3,327,820
CLUTCH FRICTION SYSTEM
Filed July 23, 1965 7 Sheets-Sheet 2

INVENTOR
JEAN MAURICE
By Young & Thompson
ATTYS.

FIG.10

June 27, 1967  J. MAURICE  3,327,820

CLUTCH FRICTION SYSTEM

Filed July 23, 1965  7 Sheets-Sheet 4

INVENTOR
JEAN MAURICE
By Young & Thompson
Attys.

INVENTOR
JEAN MAURICE
By Young + Thompson
ATTYS.

3,327,820
CLUTCH FRICTION SYSTEM
Jean Maurice, Paris, France, assignor to Société
Anonyme Francaise du Ferodo, Paris, France
Filed July 23, 1965, Ser. No. 474,318
Claims priority, application France, Aug. 4, 1964,
984,122; May 6, 1965, 16,010
2 Claims. (Cl. 192—55)

The present invention relates to clutch friction systems with a damping hub, that is to say to friction systems of the kind comprising a hub intended to be mounted on a shaft, and two coaxial portions, a first portion carrying a friction lining intended to be gripped between the plates of the clutch, while a second portion is intended to be mounted rigidly for rotation with the said shaft, the said portions being mounted so as to be angularly movable with respect to each other, within the limits of a predetermined angular displacement and against the action of elastic restoring means associated with damping means.

In accordance with a well-known form of construction, the said first portion of the friction system comprises a lining-carrier disc and a counter-disc fixed to the first disc by spacing pillars, the second portion comprises a web rigidly fixed to the hub, the said web extending between the disc and the counter-disc and comprising slots through which the said pillars pass, the said portions being elastically coupled by springs known as torsion dampers, which constitute the elastic means and which are housed in slots or windows formed in the web, the disc and the counter-disc, while the damping means comprise at least one friction washer which assists the axial positioning of the said web, the said friction washer being thus arranged between two members respectively fixed to the first and the second said parts and being thus angularly movable with respect to each other within the limits of a pre-determined angular displacement.

A friction system with a damping hub of this kind is especially utilized in the transmissions of automobile vehicles and also comprises, between the engine and the driving wheels of the vehicle, various driving or driven members which are well known, such as: transmission or return shafts, pinions of the gear-box, etc., the whole of which can be considered as forming a vibrating system capable of coming into resonance under certain conditions of use: in particular, cyclic variations of the engine torque may give rise to vibration and noise which are unpleasant to the user.

The damping of these cyclic variations of torque can be effected by dry friction, but a friction system of this kind necessary for high torques, that is to say for large cyclic variations, may prove detrimental at low torques which are generally accompanied by small cyclic variations.

Thus, for example, for low values of torque, the pinion of the gear-box which is in direct engagement may begin to oscillate and produce a characteristic humming noise; with high torques, the direct-drive pinion does not generally oscillate, but the whole train of gears may resonate and cause a rattle noise well known to specialists.

Experience has already shown that it is possible to remedy these noises and vibrations by acting at the level of the friction system, especially by employing a friction system with a damping hub of the type mentioned above. It has already been possible to secure the satisfactory elimination of these noises and vibrations over narrow ranges of torque, in particular by judiciously choosing the various characteristics of the friction system, such as the elastic characteristics, the damping characteristics, etc.

The applicant has found that it is possible to achieve the elimination of these same noises and vibrations over a wide and continuous range of torque, by associating with the elastic means, damping means with a variable action predetermined in dependence on the angular displacement between the two portions of the hub, that is to say in dependence on the torque transmitted.

The present invention has for its object improvements of the kind referred to above.

In accordance with one form of embodiment of the invention, the angular displacement between the two parts of the hub is effected in at least two distinct and successive sectors, a first sector along the whole of which the elastic means alone are in action, and a second sector along the whole of which the elastic means act in combination with damping means and have preferably an increased strength.

In accordance with one form of construction, in a friction system with a damping hub comprising a lining-carrier disc, a counter-disc fixed to the first disc by spacing pillars, a hub rigidly fixed to a web which extends between the disc and the counter-disc and which is provided with slots through which pass the said pillars, at least one set of springs known as torsion dampers housed in notches or windows in the web, the disc and the counter-disc, and at least one friction washer assisting in the axial positioning of the web, the said friction washer being thus arranged between two members angularly movable one with respect to the other within the limits of a predetermined angular displacement, the said friction washer being isolated from one of the said members by a counter-web, in combination with declutchable relative driving means which come into action at the beginning of the second sector of the displacement so as to fix the said counter-web rigidly to the other of the said members.

In accordance with another form of embodiment which enables a progressive variation of the action of the damping means to be obtained, at least one of the friction washers, known as the variable friction torque washer, is fixed for rotation with either of the two members in contact with it, while it cooperates with the other member, known as the associated member, through the intermediary of surfaces, at least one of which has at least one sloping face.

To this end, and according to a particular form of construction, the variable friction torque washer is provided with superficial notches facing bosses formed for example by punching or stamping on the associated member.

In accordance with a further form of embodiment of the invention, at least one of the damping springs has its axis inclined with respect to a plane perpendicular to the axis of the friction system.

In this way, it applies to the variable friction torque washer an axial clamping force which is variable as a function of the angular displacement of the two portions of the friction system; this means that there is produced a progressive variation of the damping in dependence on the torque transmitted, and the corresponding law of variation can be chosen and determined so that, over the range of torque considered, the noise and vibration of the transmission is considerably reduced if not eliminated.

Arrangements of this kind make it possible to attenuate or eliminate the humming noise at low values of torque and the rattle noise at high torques.

The characteristic features and advantages of the invention will further be brought out in the description which follows below of forms of embodiment given solely by way of example and without limitation, reference being made to the accompanying drawings, in which.

Figures 1, 2, 3:
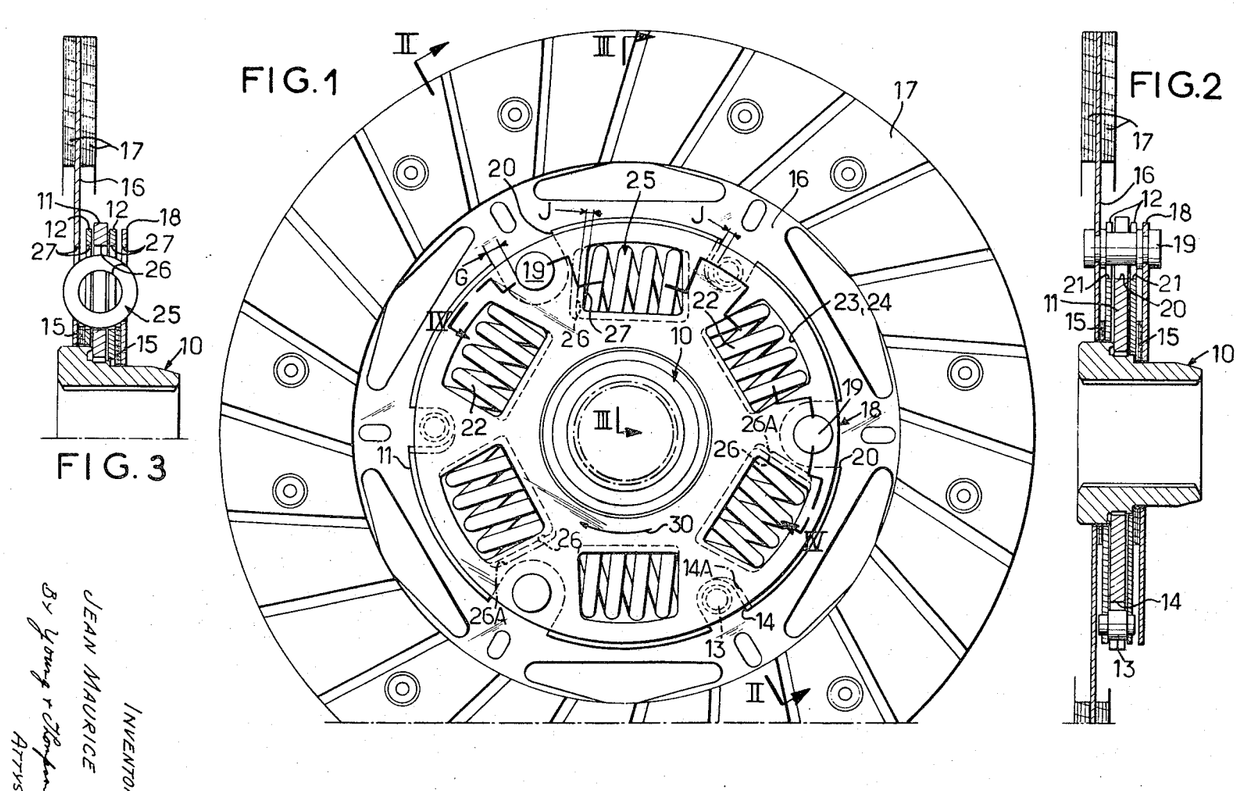
FIG. 1 is a view in elevation of a clutch friction system in accordance with the invention.
FIG. 2 is a view of this friction system in cross-section, taken along the line II—II of FIG. 1.
FIG. 3 is a view in cross-section taken along the line III—III of FIG. 1.

In accordance with the form of embodiment chosen and shown in FIGS. 1 to 3, in which there will be recognized a friction system with a damping hub, the hub 10 of this friction unit having a spline central bore, carries a radial web 11 flanked by two free counter-webs 12. These counter-webs are coupled to each other by spacers or pillars 13 which pass right through the slots 14 formed for that purpose in the periphery of the web 11, with a larger lateral clearance J.

The unit formed by the web 11 and the counter-webs 12 is enclosed in its turn, with the interposition of friction washers 15, by a disc 16 provided at its periphery with friction linings 17 of appropriate form, and by a counter-disc 18 coupled to the disc 16 by spacing pillars 19 which pass right through the slots 20 and 21, respectively formed in the periphery of the web 11 and the counter-webs 12 with a large lateral clearance G. The clearance G is made greater than the clearance J.

Tangential springs 22, that is to say extended perpendicularly to a radius passing through the centre of the hub 10, are housed, following a uniform circular distribution, in windows 23 and 24 formed respectively facing each other on the one hand in the web 11, and on the other hand in the counter-webs 12, the disc 16 and the counter-disc 18. These windows have all identically the same opening, that is to say a tangential dimension defined as above.

Tangential springs 25, forming a second set uniformly distributed along a circular line and interpolated in the first, are housed in windows 26 and 27, respectively formed facing each other, on the one hand in the web 11 and on the other hand in the counter-webs 12, the disc 16, and the counter-disc 18. The springs 25 have a strength greater than that of the springs 22 and the windows 26 formed in the web have a tangential opening or dimension greater than that of the windows 27 formed in the counter-webs, the disc and the counter-disc, so that at zero torque these windows 26 form a lateral play equal to the clearance J on each side of the associated springs 25 (see FIG. 4).

In addition, the springs 22 are arranged in their windows with practically no prestress, whereas the springs 25 have a prestress determined in accordance with the criteria defined below.

When the torque transmitted by the friction system is zero (FIG. 4), the pillars 13 and 19 are substantially at the centre of their respective notches. The same condition is true for the springs 25 with respect to the windows 26 of the web.

Figure 4:
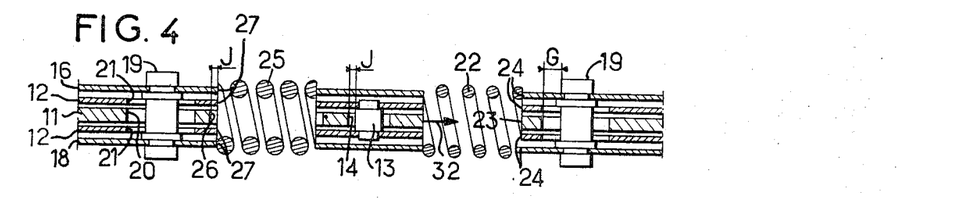
FIGS. 4 to 9 are views in cross-section of the central portion of this friction unit, taken along the curved and broken line IV—IV of FIG. 1, and illustrate the operation of the unit.
Figure 5:
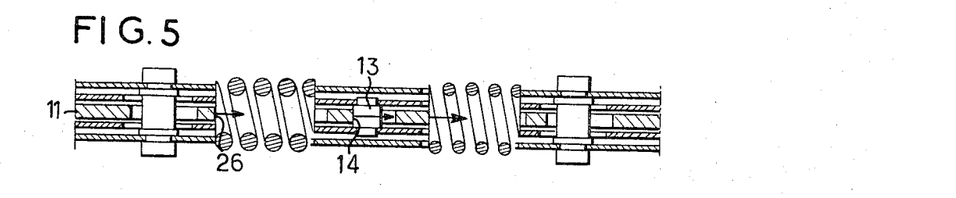

When a direct torque is applied to the friction unit and if it is assumed that the hub 10 for example is a driving member acting in the direction of the arrow 30 of FIG. 1, the web 11 alone is first angularly displaced in the direction of the arrow 32 of FIG. 4, acting in opposition to the springs 22, until the rear lateral edge of the windows 26 of this web come into abutment against the associated springs 25, and until the rear lateral edges of the notches 14 of this web come simultaneously into abutment against the associated spacing member 13, the corresponding clearances J being equal, as shown in FIG. 5.

Along the whole length of the angular sector corresponding to this first phase of movement, the springs 25 have no action and this is also true of the friction washers 15, since there is no relative movement between the counter-webs 12 on the one hand, and the disc 16 and the counter-disc 18 on the other hand.

On the contrary, if the torque applied to the hub 10 increases, the web 11, starting from the position indicated in FIG. 5, drives the counter-webs 12 against the action of the springs 25 and also the springs 22. In consequence, from the beginning of this second phase, the torque must overcome the opposing torque generated by the prestress of the springs 25 together with the friction torque due to the washers 15, since the counter-webs 12 are now in relative movement with respect to the disc 16 and the counter-disc 18.

This second phase is continued until (see FIG. 6) the clearance G is absorbed in its turn and the web 11 drives the disc 16 and the counter-disc 18 directly and positively by abutment of the rear lateral edges of its notches 20 against the spacing pillars 19.

The maximum possible movement between the two portions of the friction unit thus covers two distinct sectors, a first sector in which only the springs 22 are in action without friction, that is to say without damping, and a second sector in which the springs 22 and 25 act in combination with the friction washers 15.

Figure 6:
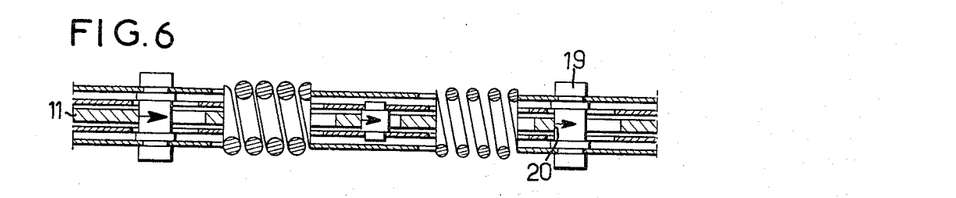
Figure 7:
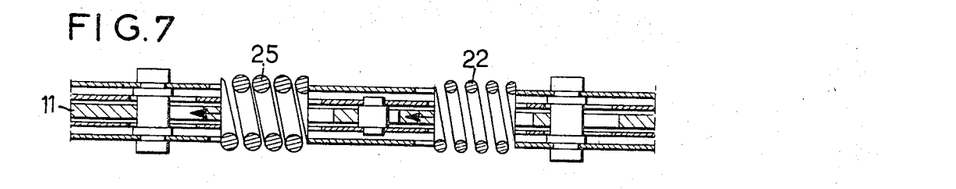
Figure 8:
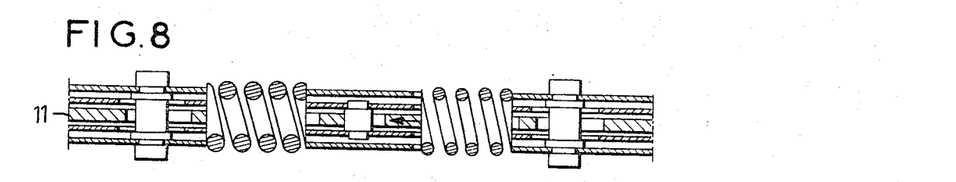
Figure 9:
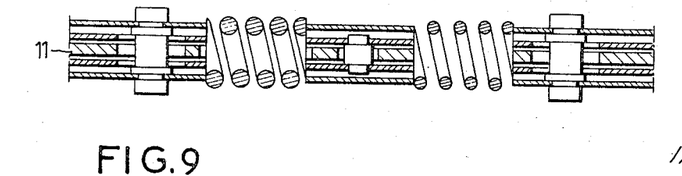

Starting from the position indicated in FIG. 6, if the torque transmitted diminishes, the operation takes place in the opposite sense, the relative driving means being by their nature automatically declutchable; in a first phase, the springs 22 and 25 act conjointly to push back the web 11 and simultaneously the springs 25 push back the counter-webs 12, which brings into operation the friction torque due to the washers 15, at the cost of a reversal of this torque (see FIG. 7); in a second phase, the springs 25 being in abutment with the disc 16 and the counter-disc 18 (FIG. 8), the counter-webs 12 are no longer driven, which eliminates the friction and it is the springs 22 alone which push back the web 11, without damping. This second phase is continued up to the return to the initial position of zero torque (see FIG. 9).

Figure 10:
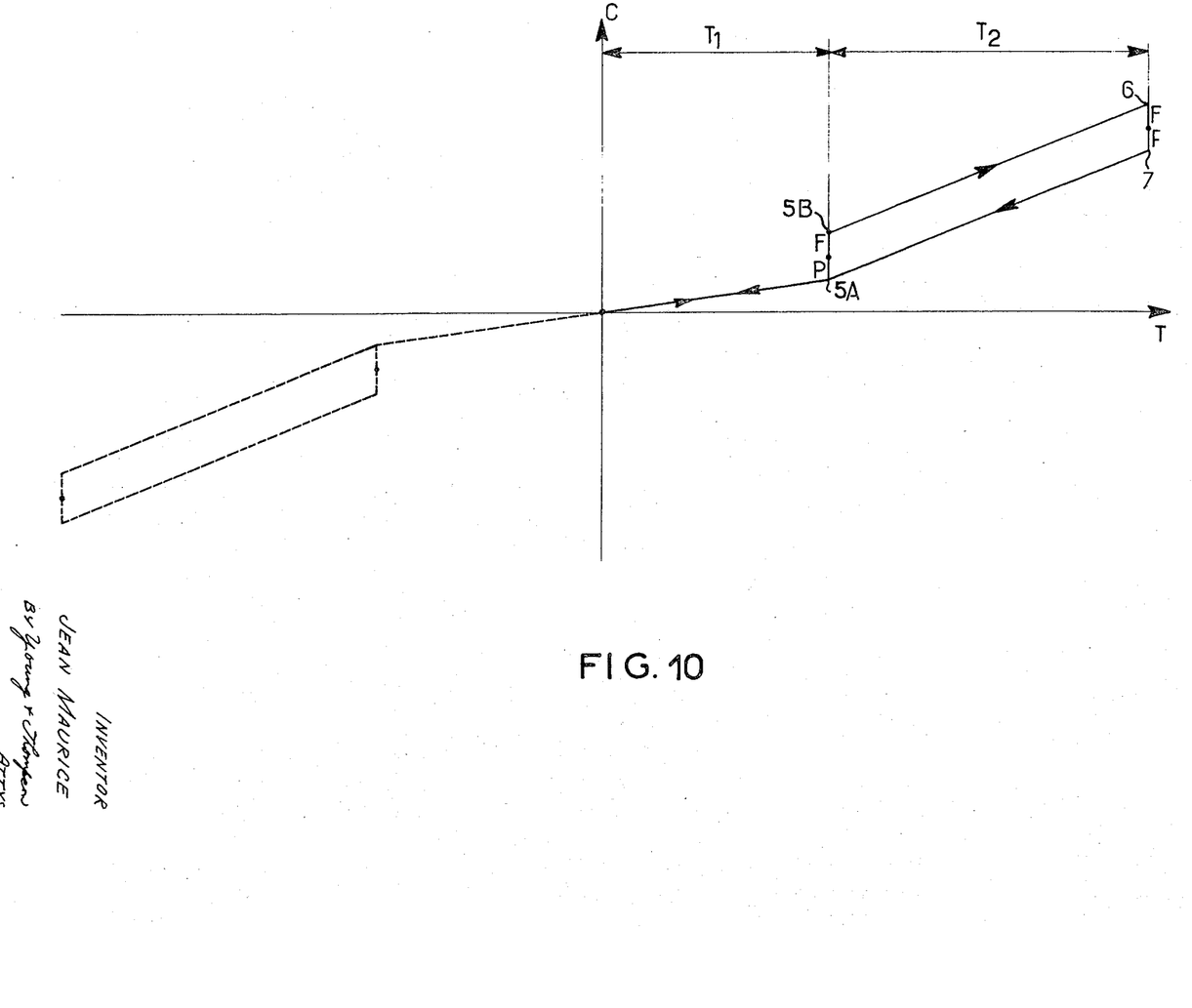
FIG. 10 is an explanatory diagram of the operation of the friction system according to the invention.

In order to illustrate this operation, there has been shown in FIG. 10 the angular displacement T of the portions of the friction system as a function of the torque C transmitted by this friction system. Along the whole of the first sector $T_1$, the movement varies linearly with the torque which only has the springs 22 to overcome. As these latter have a practically zero pre-stress, the corresponding straight line starts from the origin and continues up to a point 5A corresponding, in FIG. 5. At the beginning of the second phase of operation, the torque C must overcome simultaneously the torque P due to the prestress of the springs 25 and the friction torque F introduced by the washers 15, which is shown by the straight line 5A–5B. Then, along a second sector $T_2$, the movement again varies linearly with the torque. As the latter has to overcome the springs 22 and 25, the representative straight line has a slope greater than the initial slope; it continues up to the corresponding point 6 in FIG. 6. Beyond this point, the drive is positive.

At the moment when the torque C decreases, starting from the point 6, the friction torque F changes direction and is thus twice subtracted from the torque C, which is represented by the straight line 6–7. The displacement then decreases linearly in dependence on the torque along the length of the sector T₂ of the displacement, and if the springs 25 have advantageously been given a pre-stress such that the corresponding torque P is equal to the friction couple F, the representative straight line exactly rejoins the point 5A. Then, during the course of the sector T₁ of the displacement, the representative curve again passes through the origin, following the straight line passing through the point 5A.

For an operation of the friction in reverse, that is to say in the case where a reverse torque is applied to this friction system, the process is similar and the representative curve would be that indicated in broken lines in FIG. 10. In view of the symmetrical distribution of the clearances J and G, this curve is substantially symmetrical with that described above. It will be understood however that for particular applications, it may be advantageous to give the clearances J and G different values on each side of the corresponding pillars, springs or spacing members.

Figure 11:
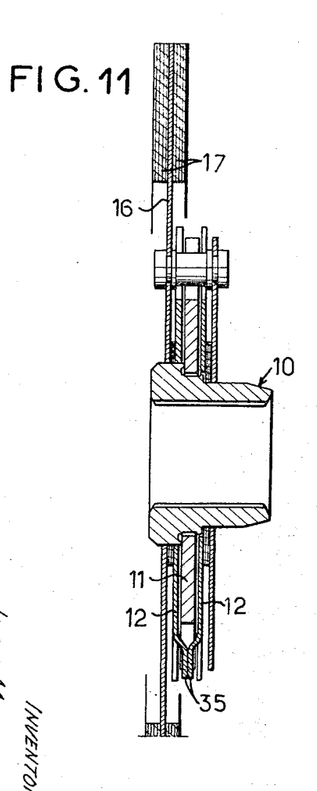
FIGS. 11 and 12 are respectively similar to FIGS. 2 and 3, and relate to an alternative form of embodiment.
Figure 12:
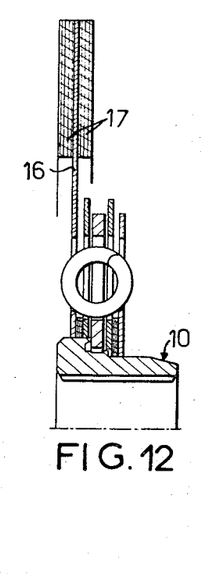

In accordance with the alternative form of construction shown in FIGS. 11 and 12, the spacing members 13 which couple together the counter-webs 12 on each side of the web 11 are formed by spacing lugs 35, cut-out from a counter-web 12 and spaced apart from this latter so as to come into contact with similar lugs 35 formed in the associated counter-web.

Figure 13:
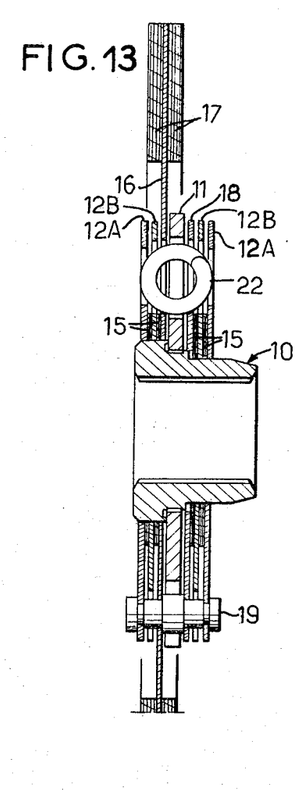
FIGS. 13 and 14 relate to another alternative form of construction.
Figure 14:
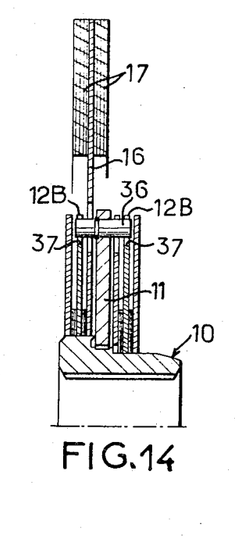

The alternative form shown in FIGS. 13 and 14 comprises two counter-webs 12A and two counter-webs 12B arranged in pairs on each side of the web 11. The disc 16 and the counter-disc 18 are arranged immediately on each side of the web 11 and are rigidly fixed to the two counter-webs 12A by the spacing pillars 19 which pass through notches formed in the other counter-webs. With each counter-web 12A and 12B there is associated a friction washer 15 which isolates it either from another counter-web, or from the disc 16, or from the counter-disc 18. In addition, the web 11 is provided with studs 36 which cooperate with notches 37 formed in the two counter-webs 12B, for driving these counter-webs after a free angular travel corresponding to a predetermined sector of the maximum possible displacement.

The operation of this alternative construction is similar to that described above; it will be understood that the tangential opening or dimension of the notches 37, for example, can be selected in such manner that the action of the counter-webs 12B is limited to one sector of the maximum possible displacement different from that in which the counter-webs 12A are operative; it is thus possible to stiffen the damping over the whole length of a third predetermined angular sector of this displacement.

Figure 15:
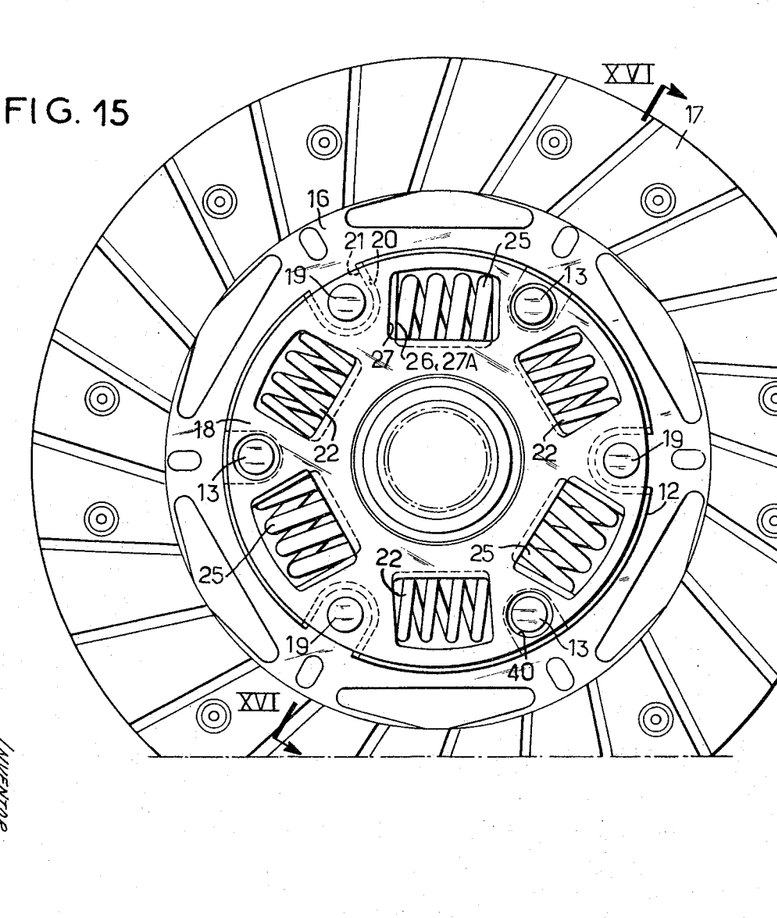
FIGS. 15 and 16 are respectively similar to FIGS. 1 and 2, and relate to a further alternative form of construction of the friction system according to the invention.
Figure 16:
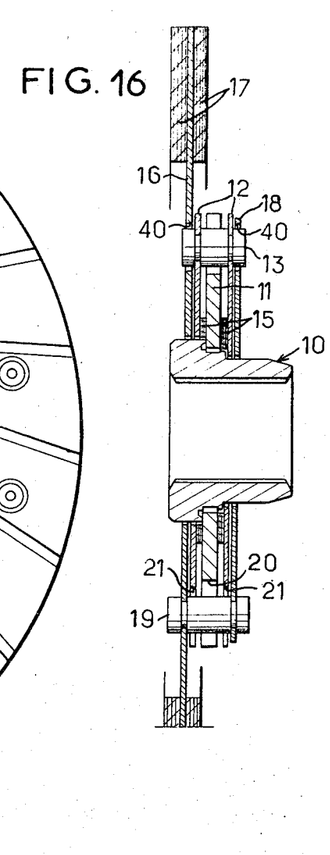

The alternative form shown in FIGS. 15 and 16 is distinguished from that shown in FIGS. 1 to 3 in the following respects: the friction washers 15 are interposed between the web 11 and the counter-webs 12; the windows 27 formed in the disc 16 and the counter-disc 18 for housing the springs 25 have an opening, that is to say a tangential dimension, greater than that of the windows 26 formed for the same purpose in the web 11, but the corresponding windows 27A formed in the counter-webs 12 have the same opening as that of the windows 26 of the web 11; the notches 20 of the web 11 have an opening greater than that of the notches 21 formed opposite in the counter-webs 12 for the passage of the pillars 19; and the counter-webs 12 are coupled together by spacing members 13, the extremities of which pass through windows 40 formed in the disc 16 and the counter-disc 18.

Figure 17:
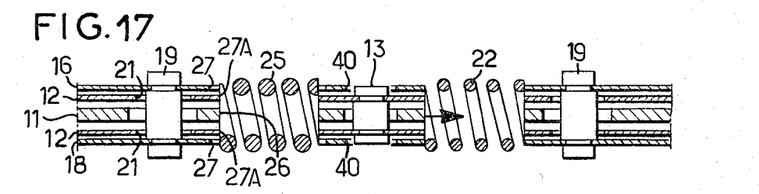
FIGS. 17 to 22 are respectively similar to FIGS. 4 to 9, and illustrate the operation of the alternative form shown in FIGS. 15 and 16.

The operation of this alternative form is very similar to that of the first. When a torque is applied to the hub of the friction system, the web 11 begins to rotate against the springs 22 alone and drives the springs 25 which in their turn push back the counter-webs 12 since they are fitted into the windows 27A of these counter-webs (see FIG. 17). During this phase, there is thus no relative movement between the counter-webs 12 on the one hand and the web 11 on the other; the friction washers 15 are inoperative.

Figure 18:
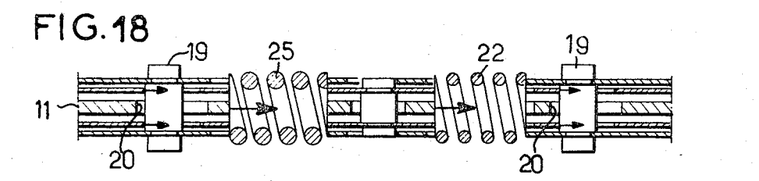

This phase which corresponds to a first sector of the maximum possible displacement, continues until the springs 25 come into abutment against the front edges of the windows 27 and until simultaneously, the rear edges of the notches 21 of the counter-webs 12 come into abutment against the associated pillars 19 (see FIG. 18). At that moment, the springs 25 come into action and while the web 11 continues its rotation, there is a relative movement between it and the counter-webs 12 and therefore friction.

Figure 19:
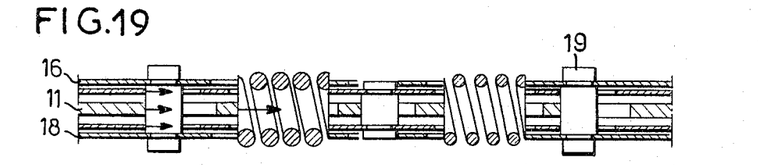
Figure 20:
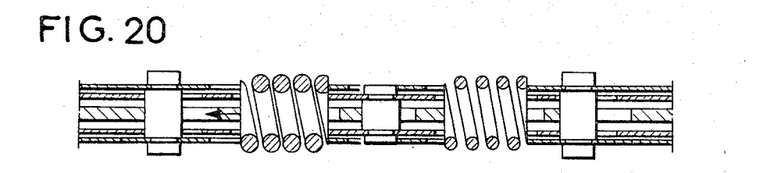
Figure 21:
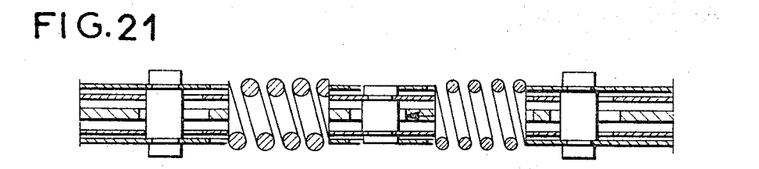
Figure 22:
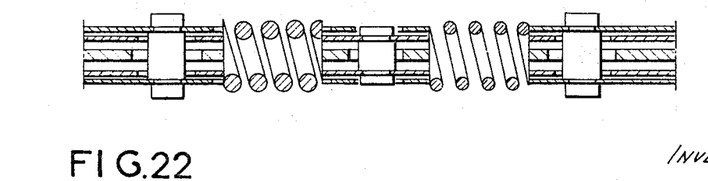

This second phase, which corresponds to a second sector of the maximum possible displacement, continues as before up to the abutment of the rear edges of the notches 20 of the web 11 against the pillars 19, that is to say up to the direct and positive drive of the disc 16 and the counter-disc 18 by the web 11 (see FIG. 19). When the torque transmitted decreases, this process is reversed (see FIGS. 20 to 22).

An alternative form of embodiment will now be described, with reference to FIGS. 23 to 25, in which it is possible to obtain a variation of the action of the damping means, which is not abrupt, as previously, but progressive.

In these figures, the same reference numbers increased by 100, have been given to similar parts corresponding to those described in the previous alternative forms.

A disc 116 is provided at its periphery and on its two faces with friction linings 117 riveted at 131. A counter-disc 118 is fixed to the disc 116 by spacing pillars 119; a hub 110 has a central boss with a splined bore; a web 111 extends between the disc 116 and the counter-disc 118; a number of torsion damping springs 220, all similar, are each housed in a window 126 of the web 111 and in two oppositely-facing windows 127, formed respectively in the disc 116 and the counter-disc 118; and two friction washers 115A and 115B are respectively interposed between the web 111 and the counter-disc 118 and between the web 111 and the disc 116.

In accordance with the invention, the washer 15A is rigidly fixed for rotation with the web 111, by sticking for example, and comprises at its periphery three superficial radial notches 230, uniformly spaced apart. Facing each notch 230, the counter-disc 118 is provided with a boss 231 formed for example by stamping.

During angular displacement of the web 111 with respect to the counter-disc 118, the bosses 231 of this latter are supported against the flanks of the notches 230 of the washer 115A so as to increase gradually the clamping force applied to this washer 115A, the friction torque of which is thus progressively increased.

It will be understood that the transverse profile of the notches 230 and the bosses 231 can be chosen in such manner that the corresponding law of variation of the damping effect by friction applied by the washer 115A is such that all noise and vibration disappear over the range of torque considered.

According to a further form of embodiment (not shown) and which brings out clearly the diverse nature of the constructions possible in order to obtain a variable strength of the damping effect of the friction washers, the damping springs, or at least some of these, are mounted inclined with respect to a plane perpendicular to the axis of the friction unit, so that their elastic forces have an axial component which is variable in dependence on the compression of the springs and therefore of the torque transmitted, and which is applied between the disc 116, the counter-disc 118 on the one hand, and the web 111 on the other, for the variable clamping of the friction washers.

It will be understood that the present invention is not limited to the forms of construction described and shown, but includes all alternative forms of execution. In particular, it will be clear that it is possible to obtain, in the manner which has been described with reference to FIGS. 13 and 14, friction systems with a damping hub for which the maximum possible angular displacement of the parts of which it is constituted has a number of separate angular sectors, during the course of which one or more elastic means come into operation, together with one or more damping means, when so required. This may be effected in any desired order of succession, the damping means acting in a first sector for example, and then being inoperative in the following sectors. In this way, it is possible to choose selectively the friction system which is best suited to the solution of any particular problem.

Figures 23, 24, 25:
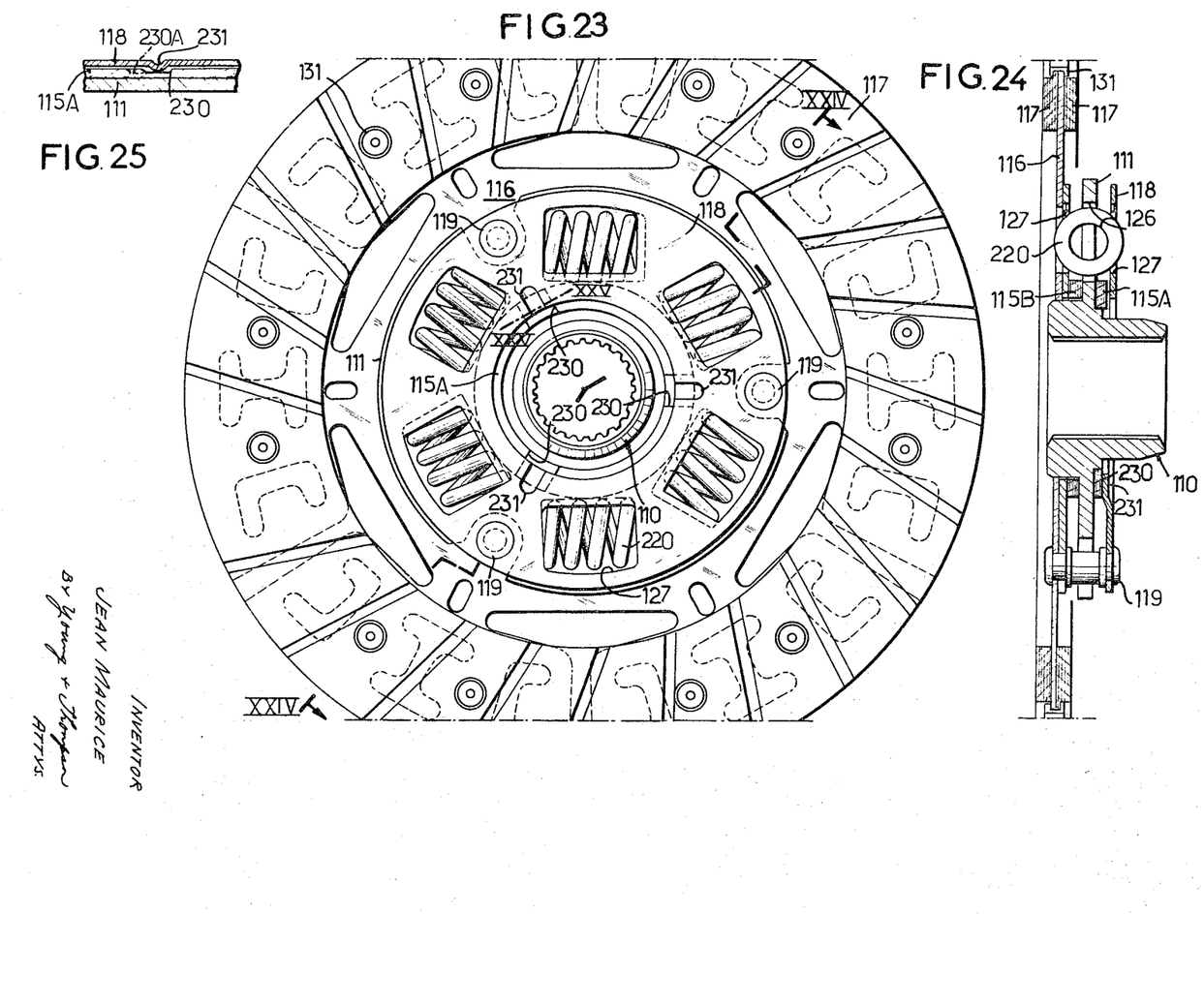
FIGS. 23 and 24 are respectively similar to FIGS. 1 and 2 and relate to a further alternative form of construction.
FIG. 25 is a view in partial cross-section of this latter alternative form, taken along the line XXV—XXV of FIG. 23.

With regard to the alternative form shown in FIGS. 23 to 25, the number, the position, the shape and the construction of the notches and bosses may give rise to a large number of alternatives, depending on the particular conditions of construction. Their law of operation may be reversed, that is to say it may correspond to a reduction of the damping when the transmitted torque increases; each friction washer may comprise a strengthening device of this kind; and the bosses may be carried by washers in cooperation with notches formed on counter-discs.

In addition, it is obviously possible to associate any one of the arrangements according to the invention with any other arrangement, alternative form or improvement to which the construction of friction systems with damping hubs may have given rise, such as for example the arrangement which formed the subject of the French patent granted to the present applicants on March 18, 1959, under the Number 1,228,977, together with the first addition to this patent taken out on March 29, 1960, under the Number 77,424.

In addition, it will be understood that the damping by friction of the elastic means may be different according to whether the clutch friction system operates for forward running or reverse, that is to say depending on whether the engine effectively drives the driver shaft or whether it is the latter which is driving the engine.

For example, as regards the forms of embodiment shown with reference to FIGS. 1 to 22, it is only necessary to this end to provide clearances having different values on each side of the springs 25 and/or of the pillars 13, as has been shown in chain-dotted lines 26A and 14A in FIG. 1. It is also possible to act on the windows 27.

This new distribution of the clearances has the natural effect of modifying the shape of the curve shown in FIG. 10, the characteristics of the torque and the friction being then different as between the forward direction of running and the reverse direction.

This has the consequence that in one direction of travel the friction is no longer constant and, for example, varies in steps, the curve being furthermore a fortiori asymmetrical with respect to the origin.

As regards the form of embodiment shown with reference to FIGS. 23 to 25, a similar result may be obtained by giving the flanks of the notches 230 different profiles on each side of the associated bosses 231 and/or by displacing, for the position of rest, that is to say at zero torque, the said notches with respect to the said bosses, as has been indicated diagrammatically in chain-dotted lines 230A in FIG. 25.

What I claim is:

1. A clutch friction assembly comprising a hub adapted to be mounted on a shaft, two coaxial members, a friction lining on one of said members to be gripped between the plates of a said clutch, the other said member being fast for rotation with said hub, elastic cushioning means acting between said members, said members being rotatable relative to each other against the reaction of said elastic means, said elastic cushioning means comprising first and second elastic cushioning means, and friction means that exert a retarding force on two relatively movable portions of said assembly against which said elastic means act, said members being rotatable relative to each other over an initial distance against the action of only said first elastic means and over a subsequent distance against the action of both said first and second elastic means and said friction means, said relatively movable portions of said assembly moving relative to each other against the action of said friction means only over said subsequent distance.

2. A clutch friction assembly as claimed in claim 1, said one member comprising a disc, said other member comprising a web, said web being flanked by a pair of counter webs on opposite sides thereof, there being a counter disc on the side of said webs and counter webs opposite said disc, said friction means being disposed and acting between the inner sides of said disc and counter disc and the outer sides of said counter webs.

References Cited
UNITED STATES PATENTS

| | | | |
|---|---|---|---|
| 1,952,892 | 3/1934 | Reed | 192—68 |
| 2,028,951 | 1/1936 | Reed | 192—68 |
| 2,127,996 | 8/1938 | Havill. | |
| 2,176,696 | 10/1939 | Wemp | 192—68 |
| 2,276,416 | 3/1942 | Nutt | 192—68 |
| 2,920,733 | 1/1960 | Lysett | 192—107 |

MARK NEWMAN, *Primary Examiner.*

ARTHUR T. McKEON, *Examiner.*